US012607443B2

(12) United States Patent
Kondo et al.

(10) Patent No.: US 12,607,443 B2
(45) Date of Patent: Apr. 21, 2026

(54) METHOD FOR CALCULATING COMPENSATION PARAMETER OF MOTION ERROR IN MACHINE TOOL, AND MACHINE TOOL

(71) Applicant: OKUMA CORPORATION, Niwa-Gun (JP)

(72) Inventors: Yasunori Kondo, Niwa-Gun (JP); Tetsuya Matsushita, Niwa-Gun (JP); Takuya Kojima, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 795 days.

(21) Appl. No.: 17/821,863

(22) Filed: Aug. 24, 2022

(65) Prior Publication Data

US 2023/0069773 A1 Mar. 2, 2023

(30) Foreign Application Priority Data

Aug. 31, 2021 (JP) ................................. 2021-141567

(51) Int. Cl.
  *G01B 5/016* (2006.01)
  *B23Q 15/12* (2006.01)
(52) U.S. Cl.
  CPC ............. *G01B 5/016* (2013.01); *B23Q 15/12* (2013.01)
(58) Field of Classification Search
  CPC ........ G01B 5/016; B23Q 15/12; B23Q 17/22; B23Q 17/00; B23Q 23/00; B23Q 1/64;
  (Continued)

(56) References Cited

U.S. PATENT DOCUMENTS

| | | | | |
|---|---|---|---|---|
| 10,357,863 | B2 * | 7/2019 | Matsushita | ........ B23Q 17/2485 |
| 2021/0132590 | A1 * | 5/2021 | Kojima | ................ G05B 19/404 |
| 2021/0154791 | A1 * | 5/2021 | Kojima | ................ G05B 19/401 |

FOREIGN PATENT DOCUMENTS

| | | | |
|---|---|---|---|
| JP | 2007-101279 A | 4/2007 | |

OTHER PUBLICATIONS

Japanese Industrial Standard, Test Conditions for Machining Centres—Part 2: Geometric Tests for Machines with Vertical Spindle or Universal Heads with Vertical Primary Rotary Axis (vertical Z-axis), JIS B 6336-2:2002, Jan. 1, 2002 (Internet<https://kikakuruicom/b6/B6335-2-2002-01.html>.

(Continued)

*Primary Examiner* — Peter J Macchiarolo
*Assistant Examiner* — Anna Josephine Saunders
(74) *Attorney, Agent, or Firm* — BURR PATENT LAW, PLLC

(57) ABSTRACT

A method includes: installing a square calibration master on a table, and measuring each of measurement surfaces A, B, and C of the square calibration master by a position measurement sensor attached to a main spindle; calculating a first squareness between the measurement surfaces A and B; calculating a second squareness between the measurement surfaces A and C; calculating a difference between the first squareness and the second squareness; comparing the difference with a preliminarily set difference threshold value; calculating an average value of the first squareness and the second squareness when the difference is equal to or less than the difference threshold value, and calculating a corrected squareness based on an angular deviation and the first squareness or the second squareness when the difference exceeds the difference threshold value; and setting the compensation parameter based on the average value or the corrected squareness.

6 Claims, 9 Drawing Sheets

(58) Field of Classification Search
CPC ........ B23Q 11/00; B23Q 15/24; B23Q 16/00;
B23Q 17/24; G01C 17/38
See application file for complete search history.

(56)                    References Cited

OTHER PUBLICATIONS

XM-60 and XM600 Multi-Axis Calibrator, Renishaw plc., Internet
< https://www.renishaw.jp/jp/xm-60-and-xm-600-multi-axis-calibrator--
39258>.

* cited by examiner

FIG.7

|  | X | Y | Z |
|---|---|---|---|
| $P_{100}$ | −310.0000 | 0.0050 | −20.0000 |
| $P_{101}$ | −235.0000 | 0.0048 | −20.0000 |
| $P_{102}$ | −160.0000 | 0.0055 | −20.0000 |
| $P_{103}$ | −85.0000 | 0.00023 | −20.0000 |
| $P_{104}$ | −10.0000 | 0.0000 | −20.0000 |
| $P_{105}$ | 0.0000 | 10.0000 | −20.0000 |
| $P_{106}$ | −0.0005 | 85.0000 | −20.0000 |
| $P_{107}$ | −0.0010 | 160.0000 | −20.0000 |
| $P_{108}$ | −0.0002 | 235.0000 | −20.0000 |
| $P_{109}$ | 0.0000 | 310.0000 | −20.0000 |
| $P_{110}$ | −10.0000 | 320.0000 | −20.0000 |
| $P_{111}$ | −85.0000 | 320.0015 | −20.0000 |
| $P_{112}$ | −160.0000 | 320.0020 | −20.0000 |
| $P_{113}$ | −235.0000 | 320.0020 | −20.0000 |
| $P_{114}$ | −310.0000 | 320.0020 | −20.0000 |

METHOD FOR CALCULATING COMPENSATION PARAMETER OF MOTION ERROR IN MACHINE TOOL, AND MACHINE TOOL

CROSS REFERENCE TO RELATED APPLICATION

This application claims the benefit of Japanese Patent Application Number 2021-141567 filed on Aug. 31, 2021, the entirety of which is incorporated by reference.

FIELD OF THE INVENTION

The disclosure relates to a method for calculating a compensation parameter for compensating for a motion error in a machine tool, and a machine tool.

BACKGROUND OF THE INVENTION

FIG. 1 is a schematic diagram of a machining center M as an exemplary machine tool including translational three axes. The machining center M includes a spindle head 2 configured to hold and rotate a tool, and a table 3 configured to hold a workpiece.

The spindle head 2 is configured to perform a translational motion of two degrees of freedom with respect to a bed 1 in mutually orthogonal translational axes of a Z-axis and an X-axis. The table 3 is configured to perform a translational motion of one degree of freedom with respect to the bed 1 in a Y-axis, which is a translational axis orthogonal to the Z-axis and the X-axis. Each of the translational axes is driven by a servomotor controlled by a numerical control unit, thereby rotating the tool mounted to the spindle head 2 to process the workpiece secured to the table 3 in any shape.

As a motion error in the machine tool, a positioning error, a straightness, an angular deviation (pitch, yaw, roll), a squareness, and the like described in JIS B 6336-2: 2002 (Internet <https://kikakurui.com/b6/B6336-2-2002-01.html> searched on Jul. 14, 2021) are included. The motion errors are transferred to the shape of the workpiece, and cause shape and dimensional errors of the workpiece. Since it is difficult in cost and technique to reduce the motion errors in the manufacturing and assembly stages of the machine and attempt to provide a higher accuracy, compensation techniques to drive each axis in consideration of the motion errors have been developed.

For a compensation control of the motion error, it is necessary to measure and calculate the motion error. Since the motion error varies, it is important to allow a regular measurement and the measurement without using a specialized measuring instrument.

The Japanese Industrial Standard (JIS B 6336-2: 2002) proposes a method for measuring and evaluating motion errors. For example, for the case of measuring the angular deviation, methods using a precision level and an optical angular deviation measuring instruments are described. For the case of measuring the squareness, a method using a straightedge ruler, a right-angle gauge, and a dial gauge is described.

On a webpage "XM-60/XM-600 multi-axis calibrator" (Renishaw plc., Internet<https://www.renishaw.jp/jp/xm-60-and-xm-600-multi-axis-calibrator--39258> searched on Jul. 14, 2021, Internet<www.renishaw.com/en/xm-60-and-xm-600-multi-axis-calibrator--39258> searched on May 9, 2022), a measuring instrument configured to simultaneously measure the positioning error, the straightness, and the angular deviation by laser is described.

JP 2007-101279 A proposes a method in which a step gauge that includes a plurality of blocks and whose inter-block distances are already-known is used. In the method, the inter-block distances are measured in a plurality of directions by changing the direction of the step gauge in the respective directions, and positioning errors of translational axes and squarenesses between the translational axes are measured and calculated.

In the measurement of the squareness by the methods described in JIS B 6336-2: 2002 and JP 2007-101279 A, there is a likelihood that, when the angular deviation of the translational axis is large, the squareness is affected by it and changes depending on the measurement position without being uniquely determined. Furthermore, there is a likelihood that, even when a command value is compensated by calculating a compensation parameter based on the measured squareness, the shape and dimensional errors of the workpiece are not improved.

Meanwhile, while it is necessary to measure and compensate for the angular deviation to remove the influence of the angular deviation of the translational axis, the measurement requires a specialized measurement as described in JIS B 6336-2: 2002 and the webpage "XM-60/XM-600 multi-axis calibrator."

Therefore, it is an object of the disclosure to provide a method for calculating a compensation parameter of a motion error in a machine tool configured to appropriately measure and compensate for the motion error in the machine tool without using a specialized measuring instrument, and a machine tool.

SUMMARY OF THE INVENTION

In order to achieve the above-described object, there is provided a method for calculating a compensation parameter of a motion error in a machine tool according to a first configuration of the disclosure. The machine tool includes a table configured to hold a workpiece, a main spindle configured to hold a tool, and three or more translational axes, the main spindle is configured to perform a relative motion of three degrees or more of translational freedom with respect to the table, and the machine tool is configured to compensate for a motion error of the translational axis in accordance with a predetermined compensation parameter. The compensation parameter is calculated using a square calibration master that includes a predetermined measurement surface A, and a measurement surface B and a measurement surface C that are perpendicular to the measurement surface A and parallel to one another, and an angle between the measurement surface A and the measurement surface B and an angle between the measurement surface A and the measurement surface C of the square calibration master are known. The method includes: installing the square calibration master on the table, and measuring each of the measurement surface A, the measurement surface B, and the measurement surface C of the square calibration master by a position measurement sensor attached to the main spindle; calculating a first squareness between the measurement surface A and the measurement surface B from a measurement result of the measurement surface A and the measurement surface B obtained by the installing of the square calibration master and the measuring of the measurement surfaces; calculating a second squareness between the measurement surface A and the measurement surface C from a measurement result of the measurement surface A and the measurement surface C obtained by the installing of the square calibration master and the measuring of the measurement surfaces; calculating a difference between the first squareness and the second squareness; comparing the difference with a preliminarily set difference threshold value; calculating an average value of the first squareness and the second squareness when the difference is equal to or less than the difference threshold value, and calculating an angular deviation of the translational axis and calculating a corrected squareness based on the angular deviation and the first squareness or the second squareness when the difference exceeds the difference threshold value; and setting the compensation parameter based on the average value or the corrected squareness.

In another aspect of the first configuration of the disclosure, which is in the above-described configuration, when the difference exceeds the difference threshold value in the determining step, the first measuring step, the first squareness calculating step, the second squareness calculating step, and the difference calculating step are performed again at each of a plurality of positions by installing the square calibration master at the plurality of positions, and the angular deviation is calculated based on the plurality of obtained differences in the squareness identifying step.

In order to achieve the above-described object, there is provided a method for calculating a compensation parameter of a motion error in a machine tool according to a second configuration of the disclosure. The machine tool includes a table configured to hold a workpiece, a main spindle configured to hold a tool, and three or more translational axes, the main spindle is configured to perform a relative motion of three degrees or more of translational freedom with respect to the table, and the machine tool is configured to compensate for a motion error of the translational axis in accordance with a predetermined compensation parameter. The compensation parameter is calculated using a square calibration master that includes a predetermined measurement surface A and a measurement surface B perpendicular to the measurement surface A, and an angle between the measurement surface A and the measurement surface B of the square calibration master is known. The method includes a first measuring step, a second measuring step, a first squareness calculating step, a second squareness calculating step, a difference calculating step, a determining step, a squareness identifying step, and a compensation parameter setting step. The first measuring step is of installing the square calibration master on the table, and measuring each of the measurement surface A and the measurement surface B of the square calibration master by a position measurement sensor attached to the main spindle. The second measuring step is of measuring the measurement surface A and the measurement surface B by the position measurement sensor by changing a direction of the square calibration master. The first squareness calculating step is of calculating a first squareness between the measurement surface A and the measurement surface B from a measurement result of the measurement surface A and the measurement surface B obtained by the first measuring step. The second squareness calculating step is of calculating a second squareness between the measurement surface A and the measurement surface B from a measurement result of the measurement surface A and the measurement surface B obtained by the second measuring step. The difference calculating step is of calculating a difference between the first squareness and the second squareness. The determining step is of comparing the difference with a preliminarily set difference threshold value. The squareness identifying step is of calculating an average value of the first squareness and the second squareness when the difference is equal to or less than the difference threshold value, and calculating an angular deviation of the translational axis and calculating a corrected squareness based on the angular deviation and the first squareness or the second squareness when the difference exceeds the difference threshold value. The compensation parameter setting step is of setting the compensation parameter based on the average value or the corrected squareness.

In another aspect of the second configuration of the disclosure, which is in the above-described configuration, when the difference exceeds the difference threshold value in the determining step, the first measuring step, the second measuring step, the first squareness calculating step, the second squareness calculating step, and the difference calculating step are performed again at each of a plurality of positions by installing the square calibration master at the plurality of positions, and the angular deviation is calculated based on the plurality of obtained differences in the squareness identifying step.

In order to achieve the above-described object, there is provided a machine tool according to a third configuration of the disclosure. The machine tool includes a table configured to hold a workpiece, a main spindle configured to hold a tool, and three or more translational axes, the main spindle is configured to perform a relative motion of three degrees or more of translational freedom with respect to the table, the machine tool is configured to compensate for a motion error of the translational axis in accordance with a predetermined compensation parameter. The machine tool includes a first measuring unit, a first squareness calculating unit, a second squareness calculating unit, a difference calculating unit, a determining unit, a squareness identifying unit, and a compensation parameter setting unit. The first measuring unit is configured to measure each of a measurement surface A, a measurement surface B, and a measurement surface C of a square calibration master by a position measurement sensor attached to the main spindle in a state where the square calibration master is installed on the table. The measurement surface A is a predetermined measurement surface. The measurement surface B and the measurement surface C are perpendicular to the measurement surface A and parallel to one another. An angle between the measurement surface A and the measurement surface B and an angle between the measurement surface A and the measurement surface C of the square calibration master are known. The first squareness calculating unit calculates a first squareness from a measurement result of the measurement surface A and the measurement surface B obtained by the first measuring unit. The second squareness calculating unit calculates a second squareness from a measurement result of the measurement surface A and the measurement surface C obtained by the first measuring unit. The difference calculating unit calculates a difference between the first squareness and the second squareness. The determining unit compares the difference with a preliminarily set difference threshold value. The squareness identifying unit calculates an average value of the first squareness and the second squareness when the difference is equal to or less than the difference threshold value, and calculates an angular deviation of the translational axis and calculates a corrected squareness based on the angular deviation and the first squareness or the second squareness when the difference exceeds the difference threshold value. The compensation parameter setting unit sets the compensation parameter based on the average value or the corrected squareness.

In order to achieve the above-described object, there is provided a machine tool according to a fourth configuration of the disclosure. The machine tool includes a table configured to hold a workpiece, a main spindle configured to hold a tool, and three or more translational axes, the main spindle is configured to perform a relative motion of three degrees or more of translational freedom with respect to the table, and the machine tool is configured to compensate for a motion error of the translational axis in accordance with a predetermined compensation parameter. The machine tool includes a first measuring unit, a second measuring unit, a first squareness calculating unit, a second squareness calculating unit, a difference calculating unit, a determining unit, a squareness identifying unit, and a compensation parameter setting unit. The first measuring unit measures each of a measurement surface A and a measurement surface B of a square calibration master by a position measurement sensor attached to the main spindle in a state where the square calibration master is installed on the table. The measurement surface A is a predetermined measurement surface. The measurement surface B is perpendicular to the measurement surface A. An angle between the measurement surface A and the measurement surface B of the square calibration master is known. The second measuring unit measures the measurement surface A and the measurement surface B by the position measurement sensor by changing a direction of the square calibration master. The first squareness calculating unit calculates a first squareness from a measurement result of the measurement surface A and the measurement surface B obtained by the first measuring unit. The second squareness calculating unit calculates a second squareness from a measurement result of the measurement surface A and the measurement surface B obtained by the second measuring unit. The difference calculating unit calculates a difference between the first squareness and the second squareness. The determining unit compares the difference with a preliminarily set difference threshold value. The squareness identifying unit calculates an average value of the first squareness and the second squareness when the difference is equal to or less than the difference threshold value, and calculates an angular deviation of the translational axis and calculates a corrected squareness based on the angular deviation and the first squareness or the second squareness when the difference exceeds the difference threshold value. The compensation parameter setting unit sets the compensation parameter based on the average value or the corrected squareness.

According to the disclosure, by measuring the three or two measurement surfaces of the square calibration master as an accuracy master by the position measurement sensor, the compensation parameter of the motion error can be obtained without using a specialized measuring instrument. Accordingly, the motion error of the machine tool can be appropriately compensated based on the obtained compensation parameter. Additionally, it can be easily determined whether the angular deviation of the translational axis adversely affects the measured squareness or not. Furthermore, even when the angular deviation of the translational axis is large, and the squareness is not uniquely determined, the compensation parameter can be obtained by measuring the angular deviation of the translational axis.

BRIEF DESCRIPTION OF THE DRAWINGS

FIG. 7 illustrates exemplary parameters of the square calibration master.

DETAILED DESCRIPTION OF THE INVENTION

The following describes embodiments of the disclosure based on the drawings.

Figure 1:
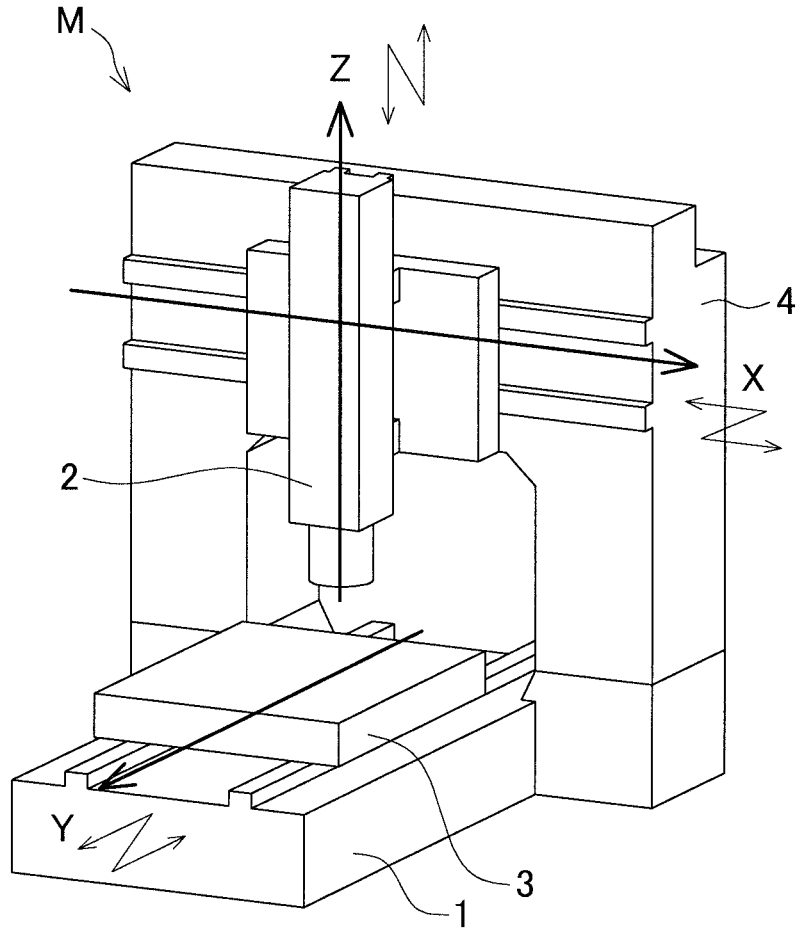
FIG. 1 is a schematic diagram of a machining center including translational axes of an X-axis, a Y-axis, and a Z-axis.
Figure 2:
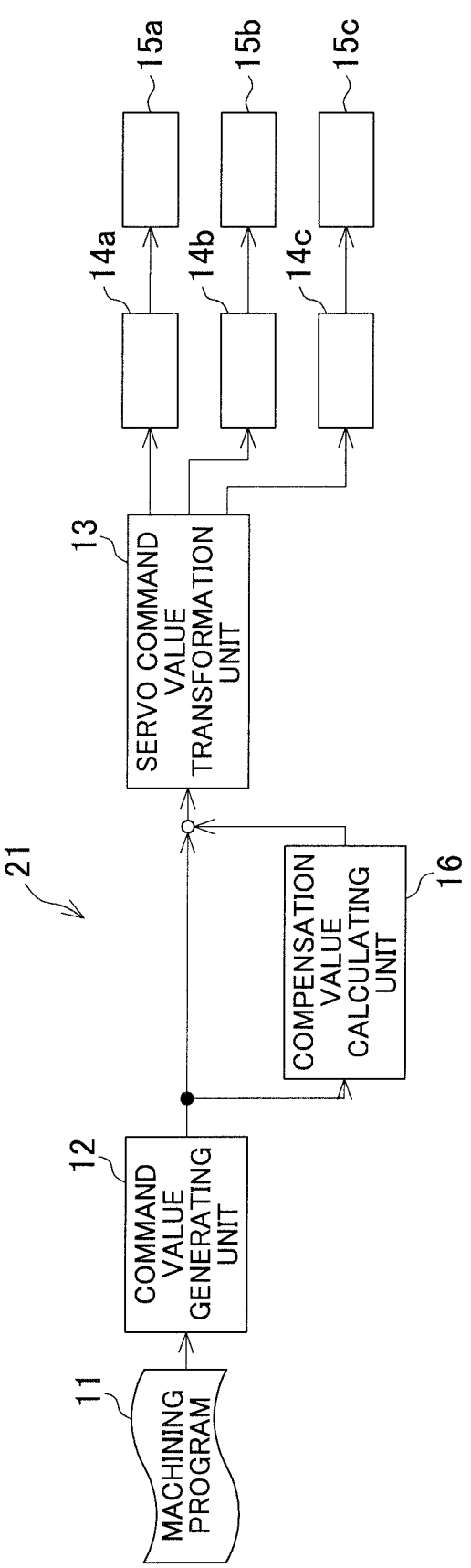
FIG. 2 is a function block diagram of a numerical control unit.

Here, a case where a squareness between X and Y axes and an angular deviation (yaw) of the Y-axis are measured to perform compensation will be described as an example. As an applied machine tool, a machining center M of FIG. 1 will be described as an example. FIG. 2 is a function block diagram of a numerical control unit 21.

In the numerical control unit 21, when a machining program 11 is input, a command value generating unit 12 generates command values for respective translational axes.

A compensation value calculating unit 16 calculates compensation values of the respective axes based on the generated command values, and a total value of the command value and the compensation value is transmitted to a servo command value transformation unit 13 to calculate servo command values. The calculated servo command values of the respective axes are transmitted to servo amplifiers 14a to 14c of the respective axes. The servo amplifiers 14a to 14c of the respective axes respectively drive servomotors 15a to 15c for the respective axes to control a relative position of a spindle head 2 with respect to a table 3.

Figure 3:
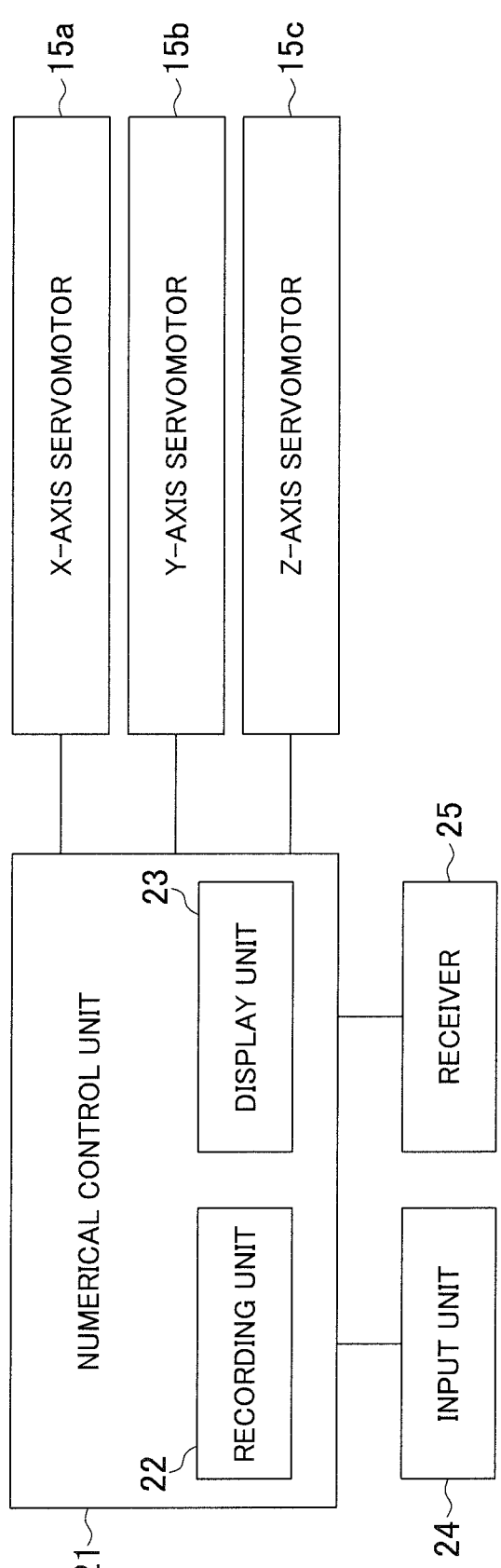
FIG. 3 is a block diagram illustrating a control configuration of the machining center.

As illustrated in FIG. 3, the numerical control unit 21 includes a recording unit 22 configured to store the compensation parameter, the calibration-master condition, a calculation program of the compensation parameter, a compensation program of a motion error, and the like. The numerical control unit 21 includes a display unit 23 for transmitting information to an operator, an input unit 24 for inputting a measurement object and the like, and a receiver 25 for a detection signal from a touch probe 101 described later.

The compensation parameter as a base of the compensation value is recorded in the recording unit 22, and includes the squareness between X and Y axes, and a Y-axis position and an angular deviation at the position in a case of a Y-axis angular deviation (yaw) as point cloud data. The angular deviations between the respective points are calculated by an interpolation, such as a linear interpolation. When it is assumed that the squareness between X and Y axes is γxy, and the Y-axis angular deviation (yaw) is EAY (i), the compensation value can be calculated by Math. 1 below.

$$\Delta Cx = \gamma xy(Y - Yk)$$

$$\Delta Cy = EAY\,(i)(X - Xk) \hspace{3cm} \text{[Math. 1]}$$

Here, $\Delta Cx$ and $\Delta Cy$ are compensation values of the X-axis and the Y-axis, respectively, X and Y are command values of the X-axis and the Y-axis, respectively, and Xk and Yk are compensation reference positions of the X-axis and the Y-axis, respectively.

Figure 4:
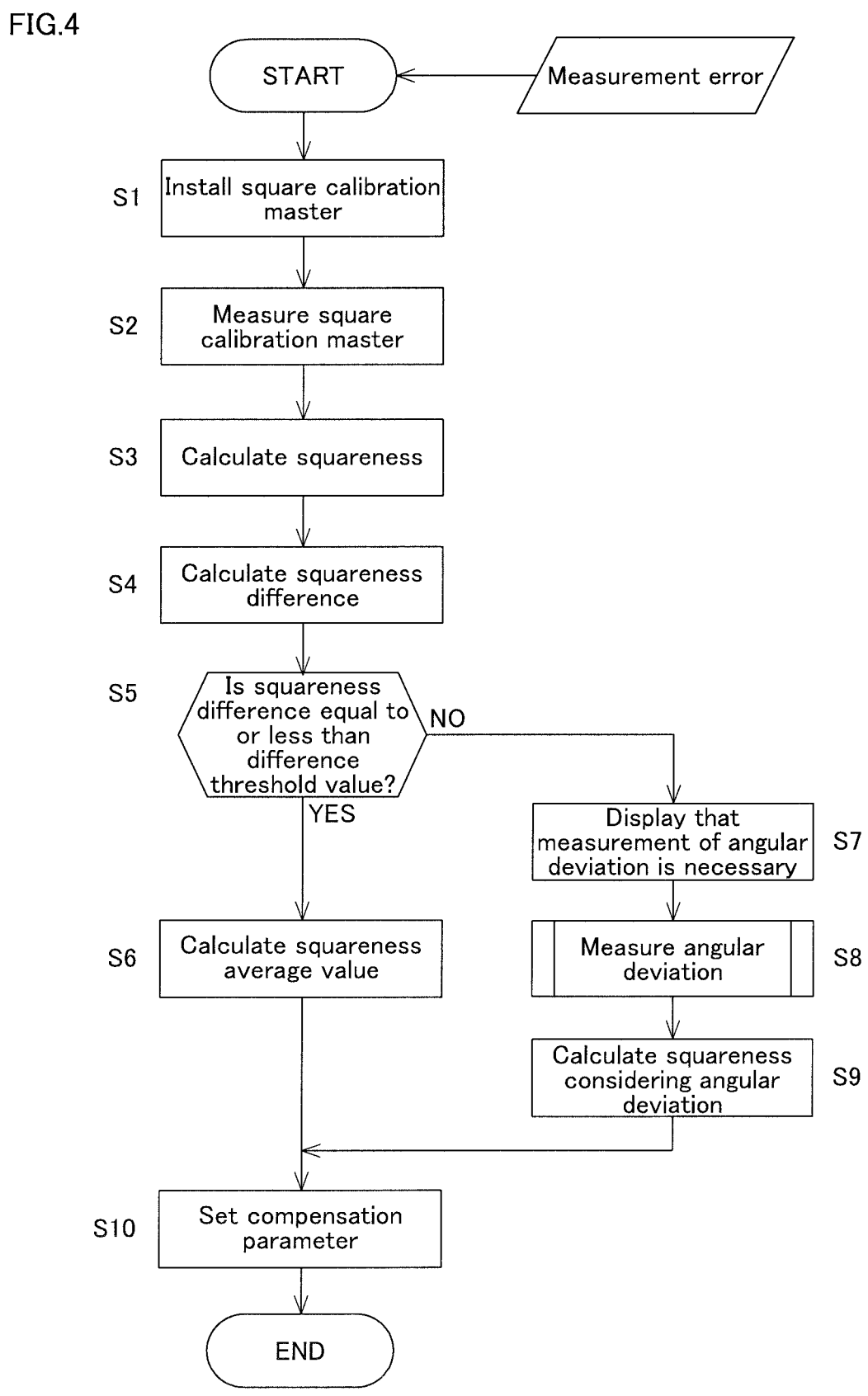
FIG. 4 is a flowchart of a calculation method for a compensation parameter.

Subsequently, a compensation parameter calculation method performed by the numerical control unit 21 will be described based on the flowchart of FIG. 4. The numerical control unit 21 functions as a first measuring unit, a second measuring unit, a first squareness calculating unit, a second squareness calculating unit, a difference calculating unit, a determining unit, a squareness identifying unit, and a compensation parameter setting unit of the disclosure.

First, the operator inputs a measurement error through the input unit 24. The input causes the numerical control unit 21 to recognize what sort of errors to be measured.

Figure 6:
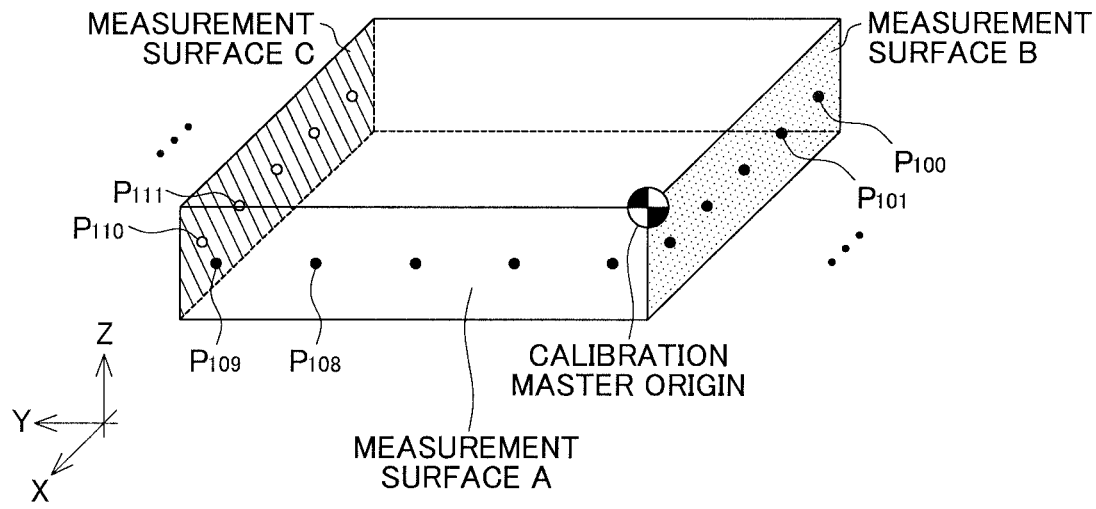
FIG. 6 illustrates an exemplary square calibration master.

FIG. 6 illustrates an exemplary square calibration master G used for the error measurement, and the input measurement error is associated with calibration value data of measurement points ($P_{100}$ to $P_{114}$) of the square calibration master G as illustrated in FIG. 7.

Figure 8:
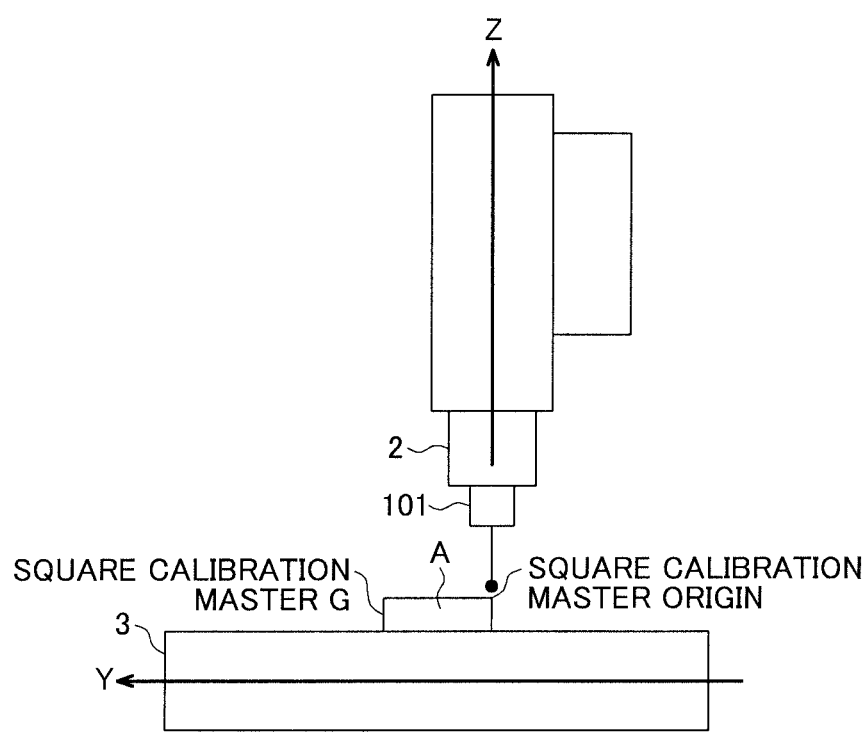
FIG. 8 is a schematic diagram of a touch probe and the square calibration master installed on a table.

First, at step (hereinafter, expressed as "S") 1, as illustrated in FIG. 8, the operator installs the square calibration master G on the table 3 such that a measurement surface A becomes parallel to the Y-axis, attaches the touch probe 101 to the spindle head 2, and positions the touch probe 101 immediately above a square calibration master origin. A stylus is attached to a distal end of the touch probe 101, and when the stylus contacts a measurement target, a signal is transmitted at the moment. When receiving the signal by the connected receiver 25, the numerical control unit 21 measures positions of the respective axes by obtaining the positions at the time point as contact positions.

Next, at S2, the measurement points ($P_{100}$ to $P_{114}$) of the square calibration master G are measured (first measuring step). At the measurement points ($P_{100}$ to $P_{104}$) of a measurement surface B, the stylus is brought in contact from a Y-direction, thus measuring Y-direction positions at the respective measurement points. At the measurement points ($P_{105}$ to $P_{109}$) of the measurement surface A, the stylus is brought in contact from the X-direction, thus measuring X-direction positions at the respective measurement points. At the measurement points ($P_{110}$ to $P_{114}$) of a measurement surface C, the stylus is brought in contact from the Y-direction, thus measuring Y-direction positions at the respective measurement points.

Next, at S3, squarenesses are calculated (first squareness and second squareness calculating step). For the measurement points ($P_{100}$ to $P_{104}$) and the measurement points ($P_{110}$ to $P_{114}$), inclinations a2 and a3 are calculated from the measured Y-direction positions ($My_{100}$ to $My_{104}$), ($My_{110}$ to $My_{114}$) and X-axis command values of the respective points by a least squares method or the like. Next, for the measurement points ($P_{105}$ to $P_{109}$), an inclination a1 is calculated from the measured X-direction positions ($Mx_{105}$ to $Mx_{109}$) and Y-axis command values of the respective points by the least squares method or the like. Then, squarenesses $\gamma xy1$ and $\gamma xy2$ are calculated by Math. 2 below.

$$\gamma xy1 = a2 - a1$$

$$\gamma xy2 = a3 - a1 \qquad \text{[Math. 2]}$$

Next, at S4, a squareness difference $\Delta\gamma xy$ is calculated by Math. 3 below (difference calculating step).

$$\Delta\gamma xy = \gamma xy2 - \gamma xy1 \qquad \text{[Math. 3]}$$

Next, at S5, the calculated squareness difference is compared with a difference threshold value preliminarily recorded in the recording unit 22 (determining step). When the squareness difference is determined to be equal to or less than the difference threshold value at S5, an average value $\gamma xy'$ of the squarenesses $\gamma xy1$ and $\gamma xy2$ is calculated at S6 (squareness identifying step).

Meanwhile, when the squareness difference is determined to be larger than the difference threshold value at S5, the display unit 23 displays that the measurement of the angular deviation is necessary at S7.

Next, at S8, the angular deviation (yaw) is measured. The measurement of the angular deviation will be described later in detail.

Next, at S9, a squareness $\gamma xy''$ considering the angular deviation (corrected squareness) is calculated from the angular deviation (yaw) EAY (i) calculated at S8 and the squareness $\gamma xy1$ calculated at S3 by Math. 4 below (S7 to S9: squareness identifying step).

$$\Delta\gamma xy = \gamma xy1 - EAY\ (Py_{100}) \qquad \text{[Math. 4]}$$

EAY ($Py_{100}$) is an angular deviation at the Y-axis position at which the measurement of the measurement point $P_{100}$ of the square calibration master G is performed at S2.

Next, at S10, any of the average value $\gamma xy'$ of the squareness obtained at S6 or the squareness $\gamma xy''$ obtained at S9 is set as the compensation parameter (compensation parameter setting step).

The obtained compensation parameter is recorded in the recording unit 22, and used for calculating the compensation value (for example, Math. 1 described above) by the compensation value calculating unit 16 of FIG. 2.

Figure 5:
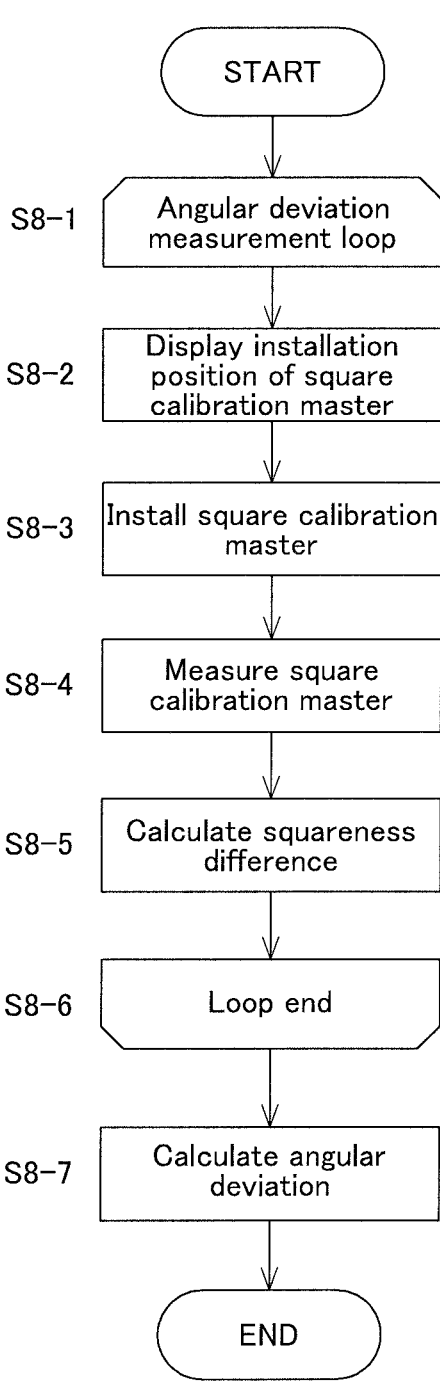
FIG. 5 is a flowchart for measuring an angular deviation.

Subsequently, the measurement of the angular deviation at S8 will be described based on the flowchart illustrated in FIG. 5.

Figure 9:
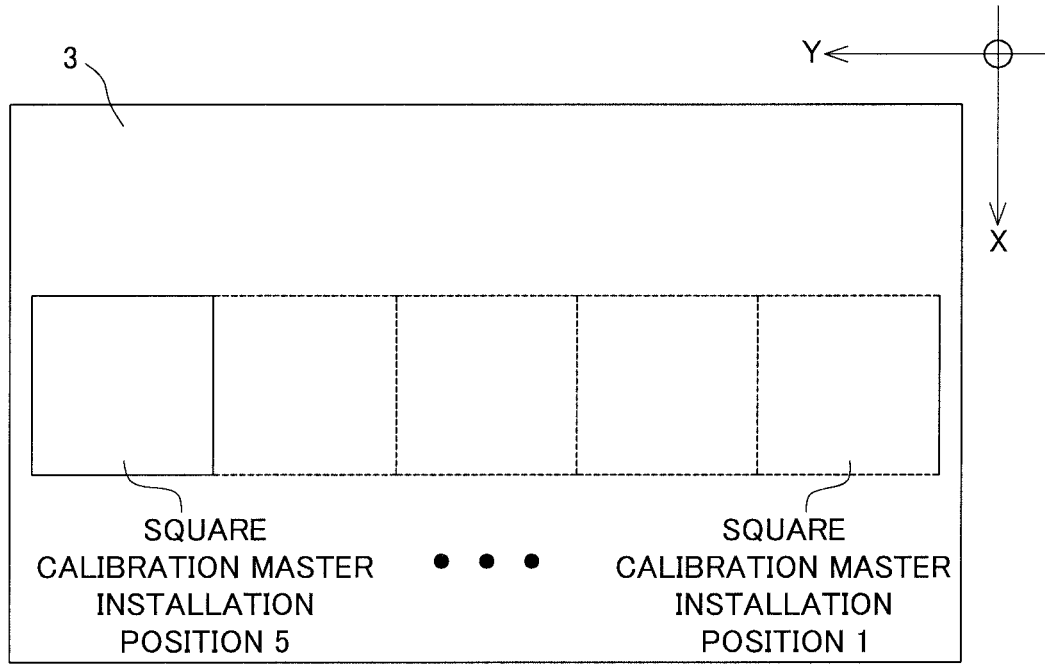
FIG. 9 is a schematic diagram illustrating an example of the square calibration master installation when a measurement is performed with the changed installation position of the square calibration master.

First, at S8-2, the installation position of the square calibration master G is displayed by the display unit 23. For example, the displayed installation position is one as illustrated in FIG. 9, and the square calibration master G is prompted to be installed at the position of a square calibration master installation position 1 at first.

Next, at S8-3, the operator installs the square calibration master G on the table 3 in accordance with the displayed installation position, and positions the touch probe 101 immediately above the square calibration master origin.

Next, at S8-4, the measurement of the three measurement surfaces A to C of the square calibration master G is performed by the method described at S2.

Next, at S8-5, two squarenesses $\gamma xy3$, $\gamma xy4$ are calculated by the method described at S3, and a squareness difference $\Delta\gamma xy$ (Y1) is calculated by the method described at S4. S8-2 to S8-5 are repeated by changing the installation position of the square calibration master G to the installation positions 2 to 5.

Next, at S8-7, the angular deviations (yaw) are calculated from the obtained squareness differences $\Delta\gamma xy$ (Y1) to $\Delta\gamma xy$ (Y5) by Math. 5 below.

$$EAY\ (i) = \Sigma \Delta\gamma xy\ (i) \qquad \text{[Math. 5]}$$

Thus, in the method for calculating the compensation parameter of the motion error and the machining center M in the configuration described above, the three measurement surfaces A to C of the square calibration master G as an accuracy master are measured by the touch probe 101 (position measurement sensor) attached to the spindle head 2 (main spindle), the two squarenesses are calculated from the measurement result to calculate the difference between the two squarenesses, the squareness is identified based on the comparison result of the difference and the difference threshold value, and the compensation parameter is set based on the identified squareness.

With the configuration, the compensation parameter of the motion error can be obtained without using a specialized measuring instrument. Accordingly, the motion error of the machining center M can be appropriately compensated based on the obtained compensation parameter. From the comparison result of the difference between the two squarenesses and the difference threshold value, it can be easily determined whether the angular deviation of the translational axis adversely affects the measured squareness or not. Furthermore, even when the angular deviation of the translational axis is large and the squareness is not uniquely determined, the compensation parameter can be obtained by measuring the angular deviation of the translational axis.

While the disclosure is described with an example of the square calibration master G including the three measurement surfaces of the measurement surface A, the measurement surface B, and the measurement surface C in the above-described configuration, the disclosure is also applicable by using a square calibration master G including two measurement surfaces of a measurement surface A and a measurement surface B.

In this case, in the machining center M, for example, the measurement is performed by a procedure below.

First, the square calibration master G is installed on the table 3, and a first measuring step of measuring each of the measurement surface A and the measurement surface B of the square calibration master G by the touch probe 101 attached to the spindle head 2 is performed.

Next, the square calibration master G is installed in a changed direction (for example, rotated about the X-axis by 180 degrees), and a second measuring step of measuring the measurement surface A and the measurement surface B by the touch probe 101 is performed.

Next, a first squareness calculating step of calculating, similarly to the above-described configuration, a first squareness between the measurement surface A and the measurement surface B from the measurement result of the measurement surface A and the measurement surface B in the first measuring step is performed.

Next, a second squareness calculating step of calculating, similarly to the above-described configuration, a second squareness between the measurement surface A and the measurement surface B from the measurement result of the measurement surface A and the measurement surface B in the second measuring step is performed.

The subsequent processes are similar to those in the above-described configuration.

Also in this case, the compensation parameter of the motion error can be obtained without using a specialized measuring instrument.

Additionally, the machine tool of the disclosure is not limited to the machining center.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A method for calculating a compensation parameter of a motion error in a machine tool, wherein the machine tool includes a table configured to hold a workpiece, a main spindle configured to hold a tool, and three or more translational axes, the main spindle is configured to perform a relative motion of three degrees or more of translational freedom with respect to the table, and the machine tool is configured to compensate for a motion error of the translational axis in accordance with a predetermined compensation parameter, and the compensation parameter is calculated using a square calibration master that includes a predetermined measurement surface A, and a measurement surface B and a measurement surface C that are perpendicular to the measurement surface A and parallel to one another, and an angle between the measurement surface A and the measurement surface B and an angle between the measurement surface A and the measurement surface C of the square calibration master are known, wherein the method comprises:

installing the square calibration master on the table, and measuring each of the measurement surface A, the measurement surface B, and the measurement surface C of the square calibration master by a position measurement sensor attached to the main spindle;

calculating a first squareness between the measurement surface A and the measurement surface B from a measurement result of the measurement surface A and the measurement surface B obtained by the installing of the square calibration master and the measuring of the measurement surfaces;

calculating a second squareness between the measurement surface A and the measurement surface C from a measurement result of the measurement surface A and the measurement surface C obtained by the installing of the square calibration master and the measuring of the measurement surfaces;

calculating a difference between the first squareness and the second squareness;

comparing the difference with a preliminarily set difference threshold value;

calculating an average value of the first squareness and the second squareness when the difference is equal to or less than the difference threshold value, and calculating an angular deviation of the translational axis and calculating a corrected squareness based on the angular deviation and the first squareness or the second squareness when the difference exceeds the difference threshold value; and setting the compensation parameter based on the average value or the corrected squareness.

2. The method for calculating a compensation parameter of a motion error in a machine tool according to claim 1, wherein when the difference exceeds the difference threshold value in the comparing of the difference with the difference threshold value, the installing of the square calibration master and the measuring of the measurement surfaces, the calculating of the first squareness, the calculating of the second squareness, and the calculating of the difference are performed again at each of a plurality of positions by installing the square calibration master at the plurality of positions, and the angular deviation is calculated based on the plurality of obtained differences in the calculating of the average value.

3. A method for calculating a compensation parameter of a motion error in a machine tool, wherein the machine tool includes a table configured to hold a workpiece, a main spindle configured to hold a tool, and three or more translational axes, the main spindle is configured to perform a relative motion of three degrees or more of translational freedom with respect to the table, and the machine tool is configured to compensate for a motion error of the translational axis in accordance with a predetermined compensation parameter, and the compensation parameter is calculated using a square calibration master that includes a predetermined measurement surface A and a measurement surface B perpendicular to the measurement surface A, and an angle between the measurement surface A and the measurement surface B of the square calibration master is known, wherein the method comprises:

installing the square calibration master on the table, and measuring each of the measurement surface A and the measurement surface B of the square calibration master by a position measurement sensor attached to the main spindle;

measuring the measurement surface A and the measurement surface B by the position measurement sensor by changing a direction of the square calibration master;

calculating a first squareness between the measurement surface A and the measurement surface B from a measurement result of the measurement surface A and the measurement surface B obtained by the installing of the square calibration master and the measuring of the measurement surfaces;

calculating a second squareness between the measurement surface A and the measurement surface B from a measurement result of the measurement surface A and the measurement surface B obtained by the measuring of the measurement surfaces by changing the direction of the square calibration master;

calculating a difference between the first squareness and the second squareness;

comparing the difference with a preliminarily set difference threshold value;

calculating an average value of the first squareness and the second squareness when the difference is equal to or less than the difference threshold value, and calculating an angular deviation of the translational axis and calculating a corrected squareness based on the angular deviation and the first squareness or the second squareness when the difference exceeds the difference threshold value; and setting the compensation parameter based on the average value or the corrected squareness.

4. The method for calculating a compensation parameter of a motion error in a machine tool according to claim 3, wherein when the difference exceeds the difference threshold value in the comparing of the difference with the difference threshold value, the installing of the square calibration master and the measuring of the measurement surfaces, the measuring of the measurement surfaces by changing the direction of the square calibration master, the calculating of the first squareness, the calculating of the second squareness, and the calculating of the difference are performed again at each of a plurality of positions by installing the square calibration master at the plurality of positions, and the angular deviation is calculated based on the plurality of obtained differences in the calculating of the average value.

5. A machine tool that includes a table configured to hold a workpiece, a main spindle configured to hold a tool, and three or more translational axes, the main spindle being configured to perform a relative motion of three degrees or more of translational freedom with respect to the table, and the machine tool being configured to compensate for a motion error of the translational axis in accordance with a predetermined compensation parameter, the machine tool comprising:

a first measuring unit configured to measure each of a measurement surface A, a measurement surface B, and a measurement surface C of a square calibration master by a position measurement sensor attached to the main spindle in a state where the square calibration master is installed on the table, the measurement surface A being a predetermined measurement surface, the measurement surface B and the measurement surface C being perpendicular to the measurement surface A and parallel to one another, and an angle between the measurement surface A and the measurement surface B and an angle between the measurement surface A and the measurement surface C of the square calibration master being known;

a first squareness calculating unit that calculates a first squareness from a measurement result of the measurement surface A and the measurement surface B obtained by the first measuring unit;

a second squareness calculating unit that calculates a second squareness from a measurement result of the measurement surface A and the measurement surface C obtained by the first measuring unit;

a difference calculating unit that calculates a difference between the first squareness and the second squareness;

a determining unit that compares the difference with a preliminarily set difference threshold value;

a squareness identifying unit that calculates an average value of the first squareness and the second squareness when the difference is equal to or less than the difference threshold value, and calculates an angular deviation of the translational axis and calculates a corrected squareness based on the angular deviation and the first squareness or the second squareness when the difference exceeds the difference threshold value; and a compensation parameter setting unit that sets the compensation parameter based on the average value or the corrected squareness.

6. A machine tool that includes a table configured to hold a workpiece, a main spindle configured to hold a tool, and three or more translational axes, the main spindle being configured to perform a relative motion of three degrees or more of translational freedom with respect to the table, and the machine tool being configured to compensate for a motion error of the translational axis in accordance with a predetermined compensation parameter, the machine tool comprising:

a first measuring unit that measures each of a measurement surface A and a measurement surface B of a square calibration master by a position measurement sensor attached to the main spindle in a state where the square calibration master is installed on the table, the measurement surface A being a predetermined measurement surface, the measurement surface B being perpendicular to the measurement surface A, and an angle between the measurement surface A and the measurement surface B of the square calibration master being known;

a second measuring unit that measures the measurement surface A and the measurement surface B by the position measurement sensor by changing a direction of the square calibration master;

a first squareness calculating unit that calculates a first squareness from a measurement result of the measurement surface A and the measurement surface B obtained by the first measuring unit;

a second squareness calculating unit that calculates a second squareness from a measurement result of the measurement surface A and the measurement surface B obtained by the second measuring unit;

a difference calculating unit that calculates a difference between the first squareness and the second squareness;

a determining unit that compares the difference with a preliminarily set difference threshold value;

a squareness identifying unit that calculates an average value of the first squareness and the second squareness when the difference is equal to or less than the difference threshold value, and calculates an angular deviation of the translational axis and calculates a corrected squareness based on the angular deviation and the first squareness or the second squareness when the difference exceeds the difference threshold value; and a compensation parameter setting unit that sets the compensation parameter based on the average value or the corrected squareness.

\* \* \* \* \*